Figure 10:
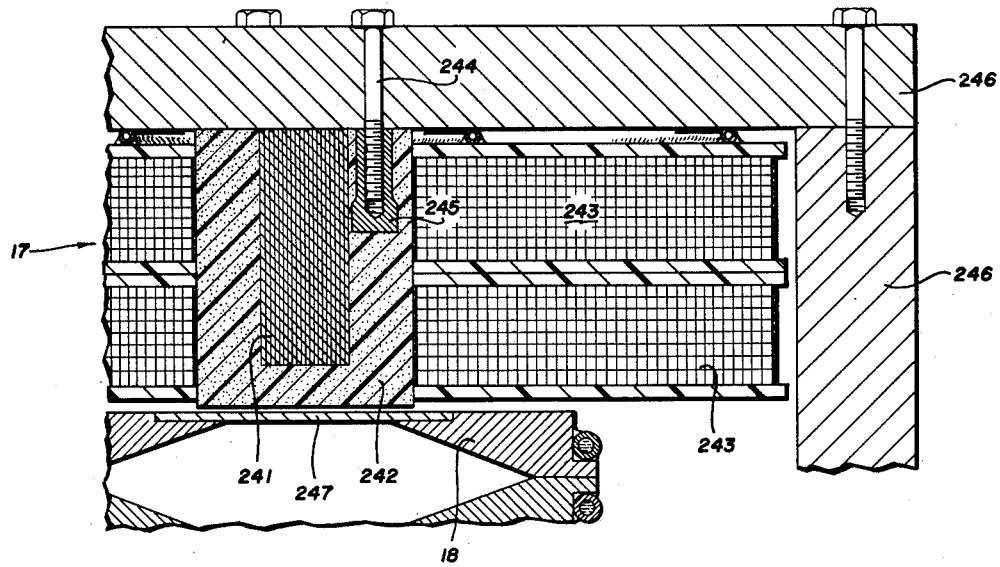

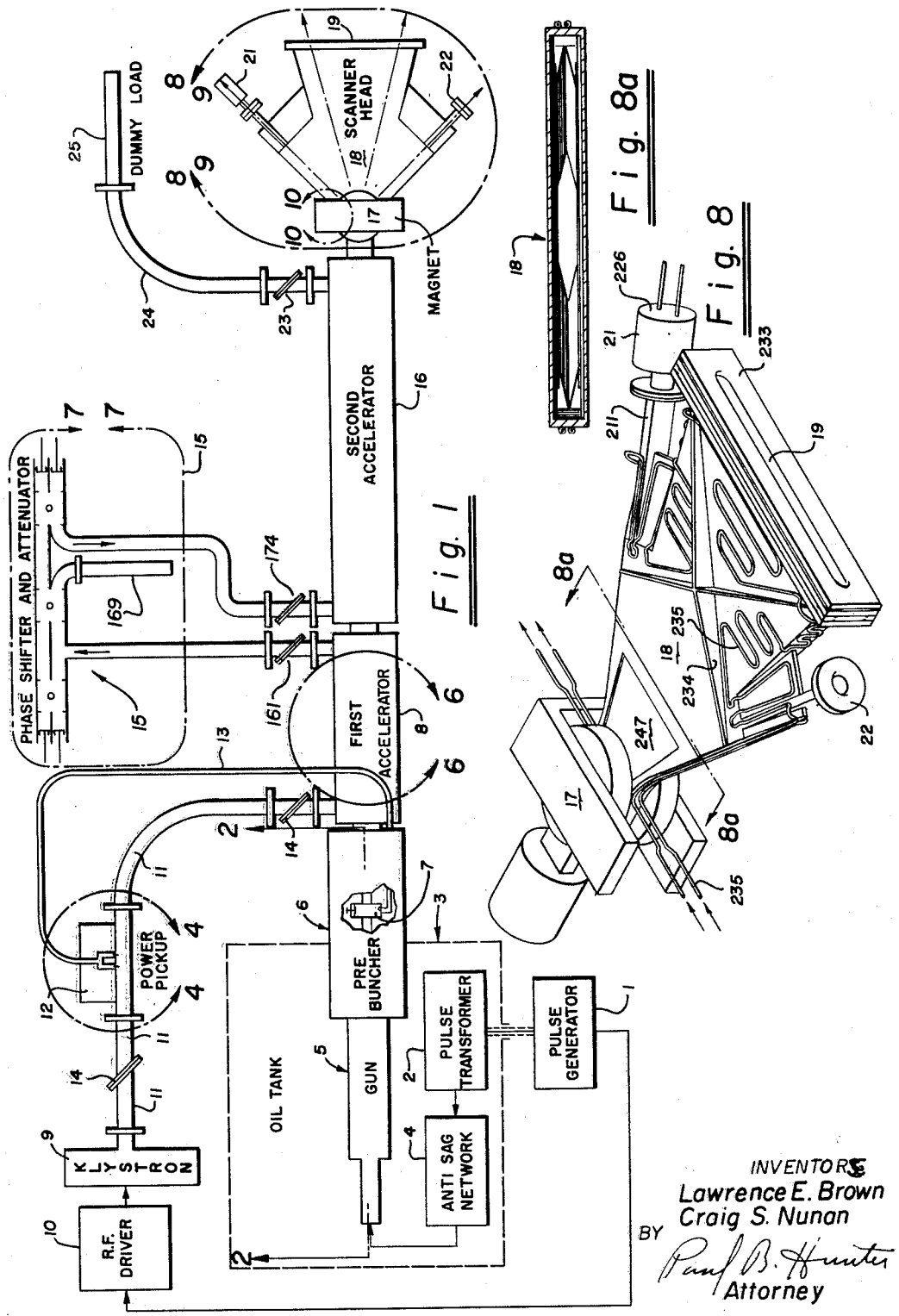

May 12, 1964 L. E. BROWN ETAL 3,133,227
LINEAR PARTICLE ACCELERATOR APPARATUS FOR HIGH ENERGY
PARTICLE BEAMS PROVIDED WITH PULSING
MEANS FOR THE CONTROL ELECTRODE
Filed June 25, 1958 8 Sheets-Sheet 2
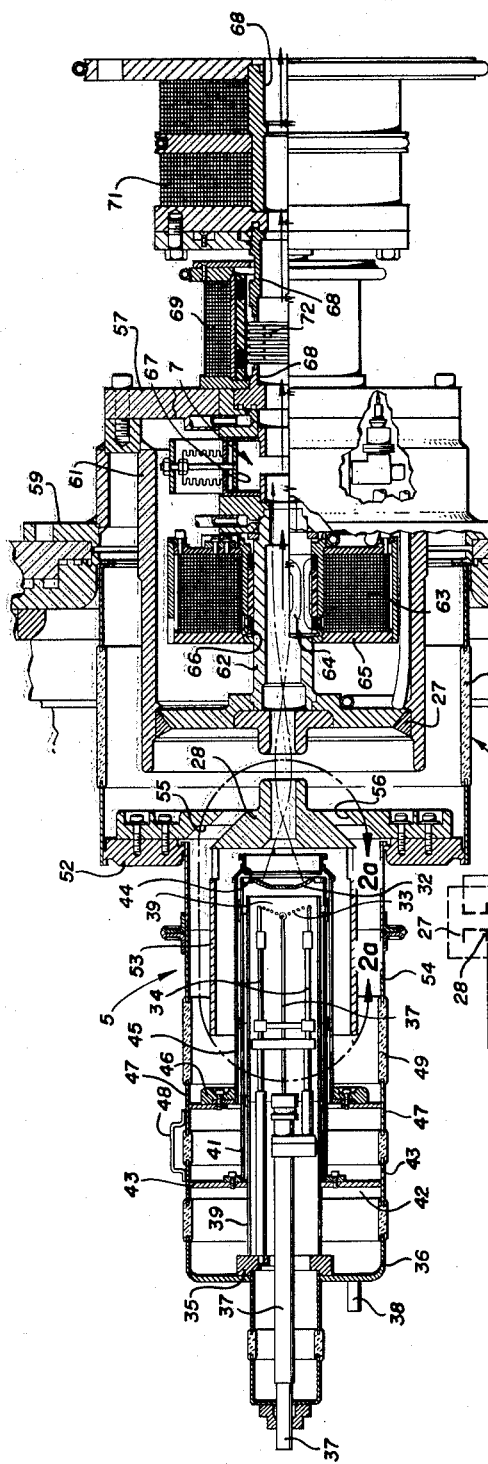
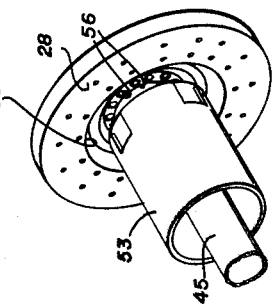
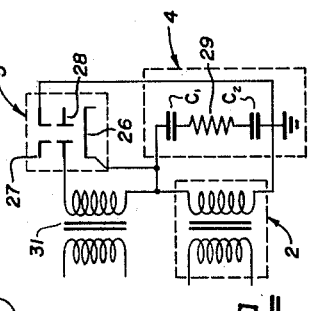
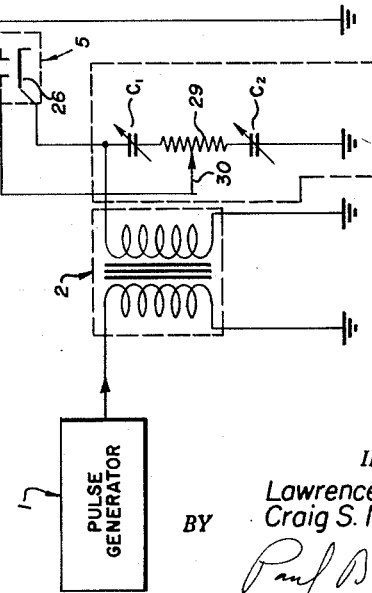
INVENTOR.
Lawrence E. Brown.
Craig S. Nunan
BY
Attorney

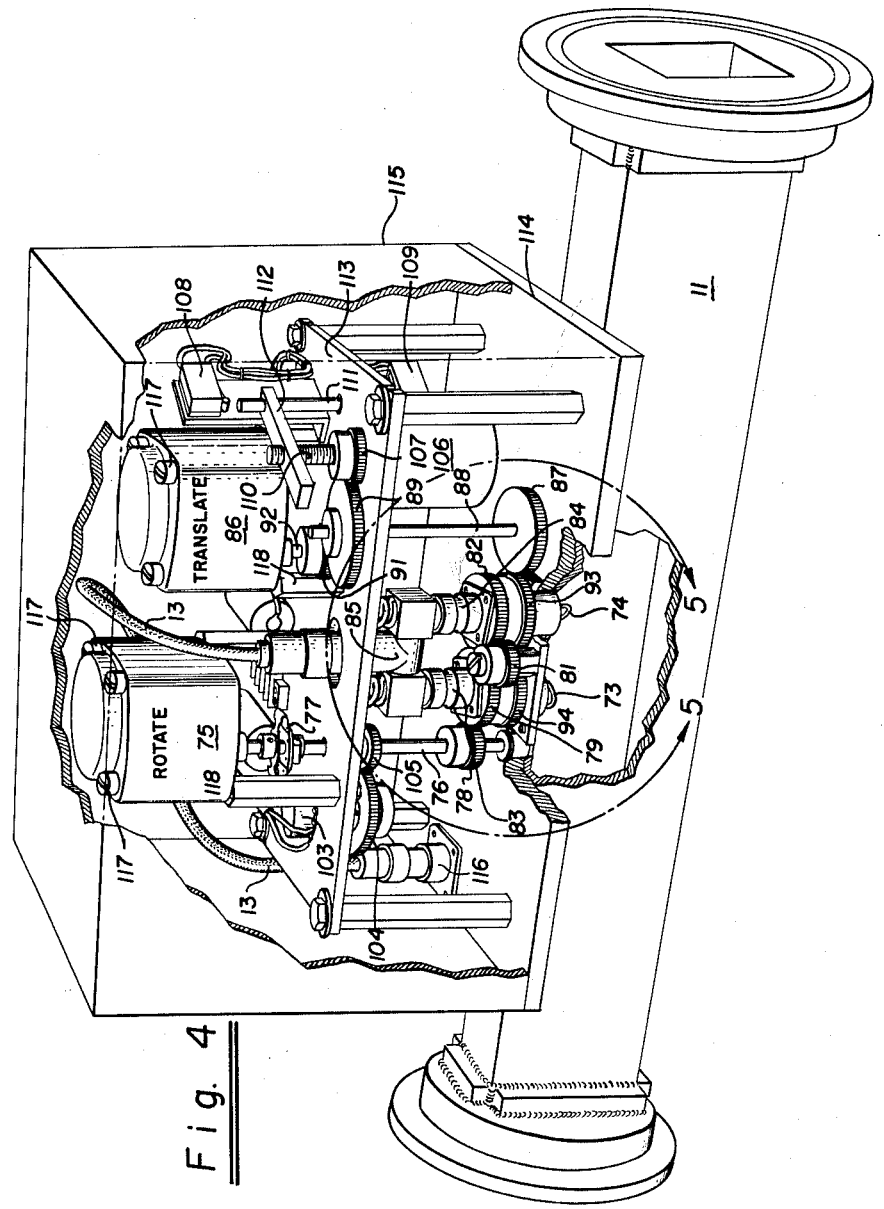

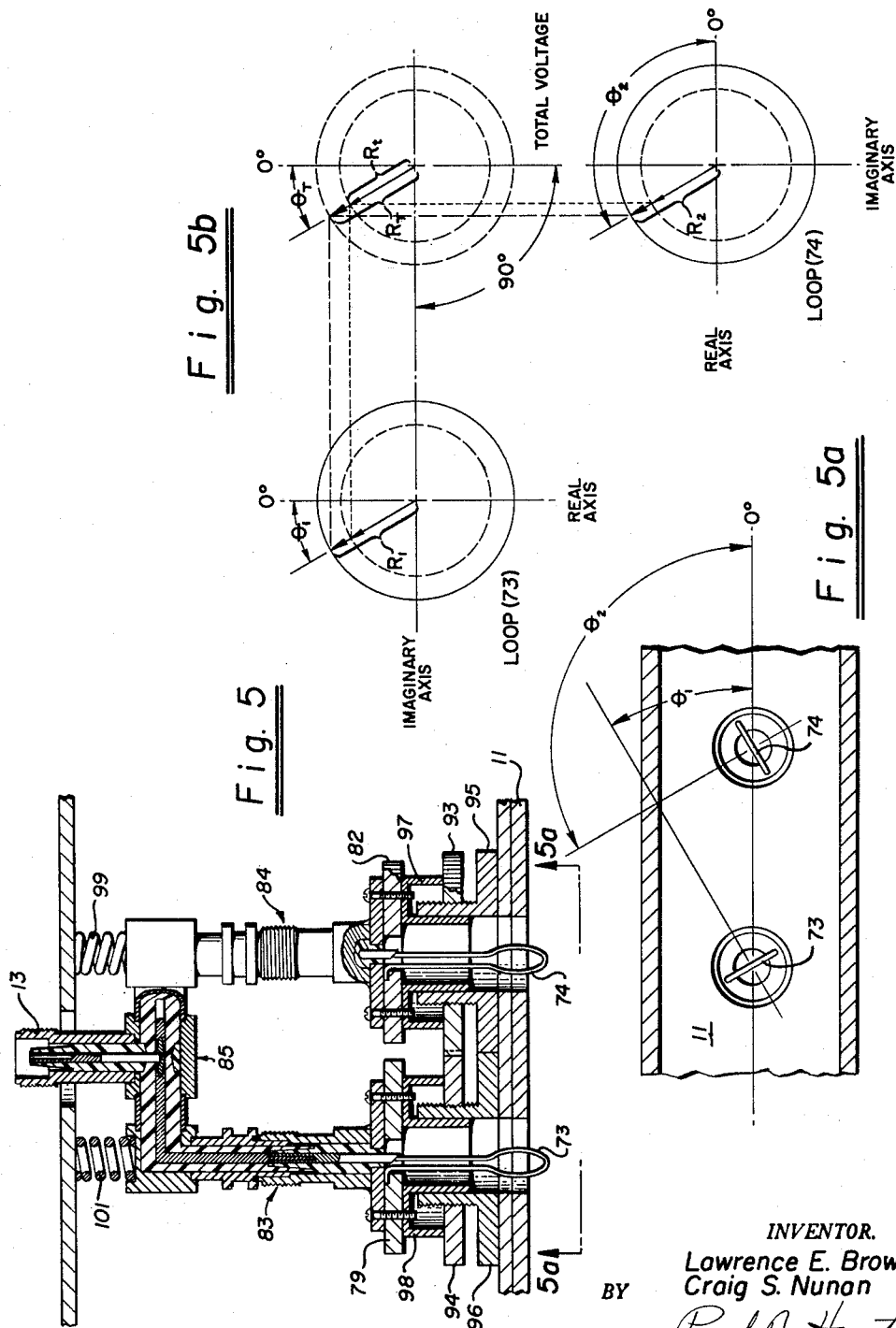

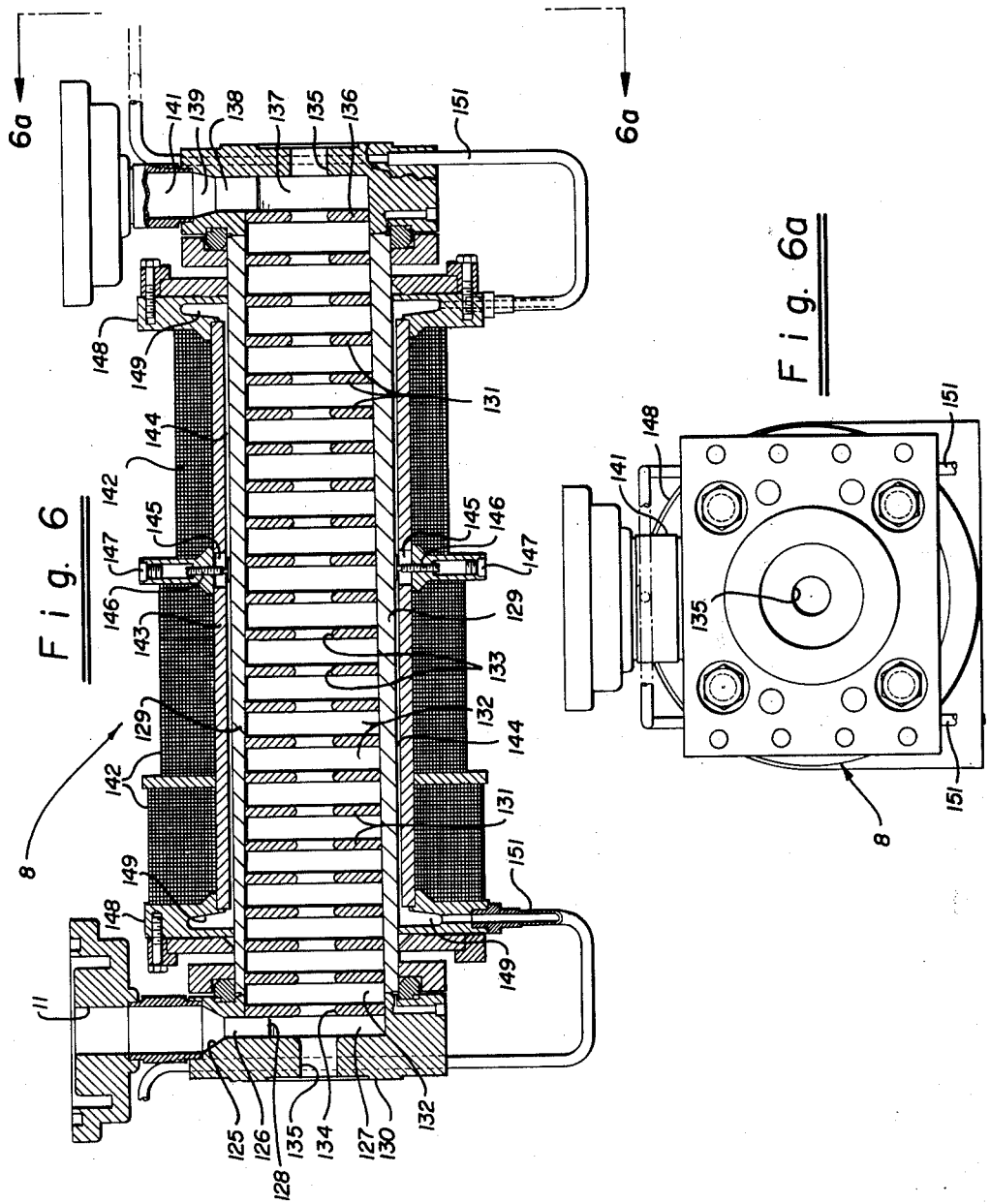

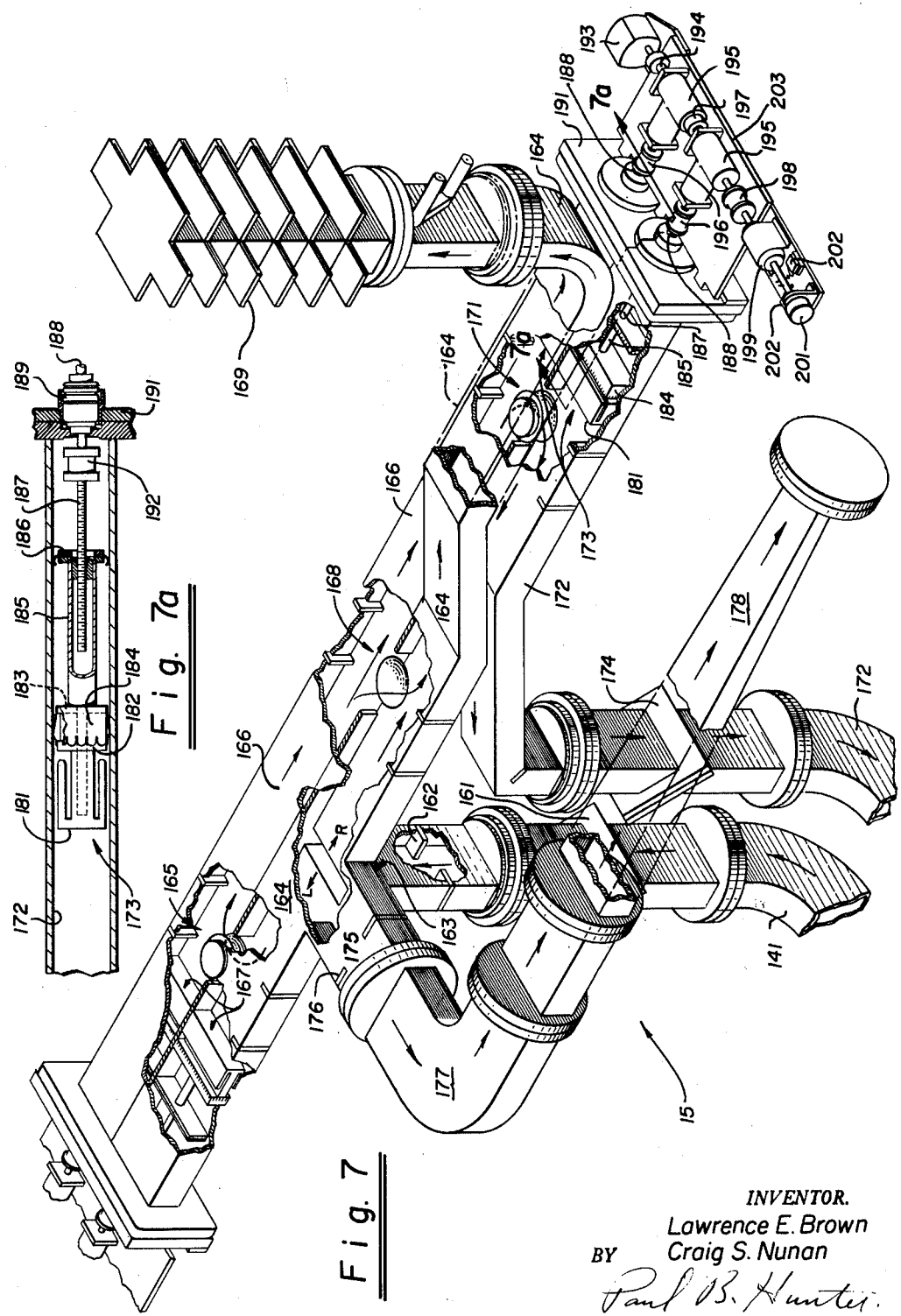

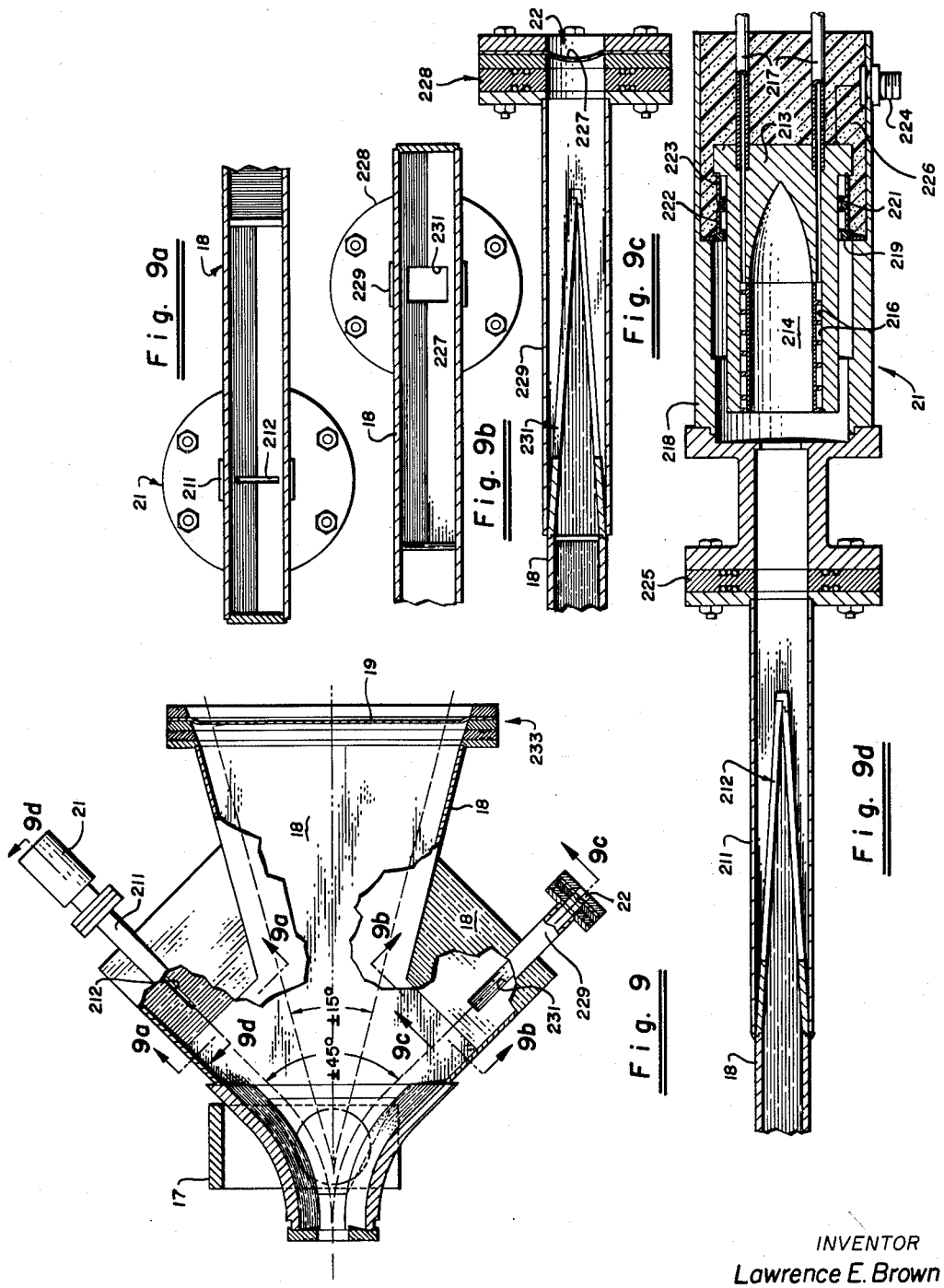

INVENTOR
Lawrence E. Brown
Craig S. Nunan

United States Patent Office 3,133,227
Patented May 12, 1964

3,133,227
LINEAR PARTICLE ACCELERATOR APPARATUS FOR HIGH ENERGY PARTICLE BEAMS PROVIDED WITH PULSING MEANS FOR THE CONTROL ELECTRODE
Lawrence E. Brown and Craig S. Nunan, Palo Alto, Calif., assignors to Varian Associates, Palo Alto, Calif., a corporation of California
Filed June 25, 1958, Ser. No. 744,608
15 Claims. (Cl. 315—5.42)

This invention relates in general to particle accelerators and more particularly to a novel linear accelerator useful for atomic research, therapy, sterilization, polymerization and other important uses.

Heretofore a given linear particle accelerator was limited in output particle energies to a narrow range of energies thereby limiting the scope of the research or process undertaken when utilizing a single accelerating machine. In addition, prior art linear accelerators were relatively inefficient as regards to the percentage of the total number of particles injected therein which received acceleration, and emerged as useful high energy particles.

The principal object of the present invention is to provide a novel relatively efficient linear accelerator having a substantial power output and capable of delivering to a target a beam of high energy particles substantially all particles such as electrons, protons etc. being at a certain preselected energy level which is variably controllable over a wide range of energies, as desired.

One feature of the present invention is the provision of a novel antisag circuit coupled into the output circuit of the high voltage step up pulse transformer for improving the low frequency response of the transformer thereby eliminating undesired sag of pulses applied to the electrodes of the emitter whereby all particles emitted from the emitter have substantially equal energies.

Another feature of the present invention is the provision of a novel nonintercepting control electrode positioned as between a cathode and accelerating anode in the gun assembly and serving to shield the cathode from the high anode voltages and adapted to have potentials applied thereto for controlling beam emission whereby the pulse width of beam emission may be precisely controlled, as desired.

Another feature of the present invention is the provision of a novel R.F. power pickup means serving to excite a pre-bunching cavity disposed in the beam path between an electron gun assembly and the first accelerating section for properly phasing the waves in the first accelerating section with the pre-bunched electrons to be accelerated whereby maximum utilization of the electrons available for acceleration is obtained.

Another feature of the present invention is the provision of a novel chamber circumscribing the accelerating slow wave structure and containing therewithin a circulating coolant for preventing overheating of the accelerating sections whereby electrical stability is substantially enhanced.

Another feature of the present invention is the provision of a novel phase shifter and power attenuator means serving to control the power level and phase of the driving wave energy applied to the final accelerating section thereby permitting the selection of the desired output energy for the accelerated particles from a wide range of particle energies while maintaining the beam energy substantially uniform.

Another feature of the present invention is the provision of a novel noncontacting waveguide shorting plunger assembly.

Another feature of the present invention is the provision of a novel beam scanner head wherein the side walls at the extreme scanning angles are inwardly converged to minimize damage to the walls thereof by inadvertent particle beam bombardment.

Another feature of the present invention is the provision of a novel energy selecting ports within the scanning head for monitoring and extracting certain selected beam energies.

Another feature of the present invention is the provision of a novel beam deflecting magnet assembly including a novel pole piece composition whereby the deleterious effects of eddy current power loss and magnetic shielding are minimized thereby enhancing beam deflection efficiencies.

Another feature of the present invention is the provision of a novel beam scanner head, said head including a side wall portion disposed within the gap of the beam deflecting magnet, and said side wall portion being vacuum tight and having low electrical conductivity whereby the deleterious effects of eddy current shielding of the beam may be minimized, in use, thereby enhancing the beam deflection efficiency.

These and other features and advantages will be more apparent after a perusal of the following specification taken in connection with the accompanying drawings wherein, FIG. 1 is a block schematic diagram of the novel linear accelerator of the present invention, FIG. 2 is a cross section view of the structure of FIG. 1 taken along line 2—2 in the direction of the arrows, FIG. 2a is an isometric view of a portion of the structure of FIG. 2 delineated by line 2a—2a, FIG. 3 is a circuit diagram showing the novel antisag circuit of the present invention, FIG. 3a is a circuit diagram of an alternate antisag circuit of the present invention, FIG. 4 is an isometric partially cutaway view of a portion of the structure of FIG. 1 delineated by line 4—4, FIG. 5 is an enlarged cross sectional view of a portion of the structure of FIG. 4 delineated by line 5—5, FIG. 5a is a bottom view of FIG. 5 taken along line 5a—5a in the direction of the arrows, FIG. 5b is a vectorial diagram graphically illustrating the electrical operation of the apparatus of FIG. 5, FIG. 6 is a longitudinal cross sectional view of a portion of the structure of FIG. 1 delineated by line 6—6, FIG. 6a is an end view of the structure of FIG. 6 taken along line 6a—6a in the direction of the arrows, FIG. 7 is an enlarged isometric view partially cutaway of a portion of the structure of FIG. 1 delineated by line 7—7, FIG. 7a is an enlarged cross sectional view of a portion of the structure of FIG. 7 taken along line 7a—7a in the direction of the arrows, FIG. 8 is an enlarged isometric view of a portion of the structure of FIG. 1 delineated by line 8—8, FIG. 8a is a cross sectional view of the structure of FIG. 8 taken along line 8a—8a in the direction of the arrows, FIG. 9 is an enlarged cross sectional view partially cutaway of a portion of the structure of FIG. 1 delineated by line 9—9, FIG. 9a is an enlarged cross sectional view of the structure of FIG. 9 taken along line 9a—9a in the direction of the arrows, FIG. 9b is an enlarged cross sectional view of a portion of the structure of FIG. 9 taken along line 9b—9b in the direction of the arrows, FIG. 9c is an enlarged cross sectional view of a portion of the structure of FIG. 9 taken along line 9c—9c in the direction of the arrows, FIG. 9d is an enlarged cross sectional view of a portion of the structure of FIG. 9 taken along line 9d—9d in the direction of the arrows, and FIG. 10 is an enlarged cross sectional view of a portion of the structure of FIG. 1 delineated by line 10—10.

Referring now to FIG. 1 of the drawings there is shown in block diagram form the novel linear accelerator apparatus of the present invention. The linear accelerator will first be described in general followed by a more complete description of its novel components.

The specific linear accelerator depicted in the drawings and described in the following specification is especially designed for accelerating electrons. However, many features of the present invention are equally applicable to accelerating other particles such as, for example, protons. For instance, the features of the present invention pertaining to apparatus for operating upon the beam after the beam enters the first accelerating slow wave structure are equally applicable to particles other than electrons.

A pulse generator 1 delivers a relatively low voltage square pulse as of, for example, 13 kv. to a pulse transformer 2 which steps up the voltage of the pulse to approximately 150 kv. The pulse generator 1 contains means therein for varying the width of the pulses up a maximum width of 6 microseconds. In addition means are provided within the pulse generator 1 for varying the pulse repetition rate from 0 up to 360 pulses per second. The desired pulse width and repetition rate is selected according to the research or process being conducted. The high voltage pulse obtained in the secondary of the pulse transformer 2 is not square, as desired, but is sagged due to the poor low frequency response of the transformer 2. Therefore, a novel antisag network 4 is connected to the secondary of the pulse transformer 2 and serves to square the high voltage pulse. The squared high voltage pulse is applied to the electrodes within an electron gun assembly 5 including a novel control electrode serving to trigger the emission of an electron beam. The pulse transformer 2, antisag network 4, electron gun assembly 5 and a portion of the pre-buncher 6 are submerged in an oil tank 3 to prevent arcing over of these components and to provide cooling thereof in use.

The beam of electrons is fed to a pre-buncher 6 which contains therewithin a pre-bunching cavity 7 disposed in the beam path and through which the electron beam passes. As the beam passes through the pre-bunching cavity 7 the beam is velocity modulated such that the beam will form into bunches of electrons as it passes into the first accelerating section 8.

A single high power high frequency source 9 as of, for example, a klystron amplifier serves to provide substantially all of the R.F. energy utilized within the linear accelerator for acceleration of the beam. More specifically, the high frequency source 9 supplies peak R.F. power in the order of 5 megawatts at a certain high frequency as of, for example, 2,800 megacycles via waveguide 11 to the first accelerating section 8. The high frequency source 9 is pulsed on in synchronism with the pulses derived from the pulse generator 1 and its R.F. input power is derived from a synchronously pulsed R.F. driver 10. A portion of the high frequency energy propagating through waveguide 11 to the first accelerating section 8 is picked up via a novel power pickup 12 and fed via a coaxial line 13 to the pre-bunching cavity 7. The power pickup 12 includes means for completely and independently varying both the magnitude and phase of the power applied to the pre-bunching cavity 7. Since the same high frequency source 9 supplies the R.F. to the first accelerating section 8 and to the pre-bunching cavity 7 and since the power applied to the pre-bunching cavity may be varied in phase and amplitude, as desired, with respect to the power applied to the first accelerating section 8, the bunches of electrons within the beam arriving at the first accelerating section 8 are controlled to arrive substantially at a desired phase-stable position on the traveling sine wave of the electromagnetic waves propagating through the slow wave structure therewithin as, for example, 30° ahead of the crest. In this manner optimum utilization of the beam is obtained; i.e., a large fraction of the injected electrons are accelerated, a large fraction of the input R.F. power is converted to electron beam power and the accepted electrons are bunched to a small phase spread with small energy spread.

Two gas tight wave permeable windows 14 are provided in the waveguide 11 on both sides of the power pickup 12 for vacuum sealing the high frequency source 9 from the remaining linear accelerator apparatus as leaks in the vacuum system of the remaining portion of the linear accelerator would contaminate the high frequency source 9. Peak powers of 5 megawatts and an average power of 10 kilowatts are propagated through the windows 14 and therefore it is desired to have the wave permeable windows cooled. The section of waveguide 11 between the wave permeable windows 14 is pressurized with a gas having substantial dielectric strength for cooling the windows 14 and further to prevent voltage breakdowns in the waveguide 11 in the vicinity of the power pickup 12.

As the accelerated electron beam emerges from the first accelerating section 8 the particles making up the beam will have attained energies of approximately 3–4 million electron volts. The remaining R.F. energy that has not been transformed into beam energy is propagated outwardly of the first accelerator section 8 to a novel phase shifter and power attenuator 15 wherein the phase and magnitude of the power applied to the second accelerator section 16 may be adjusted, as desired, in order to further accelerate or decelerate the particles to any preselected energy to within the range of from 2 to 12 mev.

The beam output of the second accelerator section 16 is fed through the gap of a beam deflecting magnet 17 and thence through a scanner head 18 closed off at its flared end by an electron permeable window 19, and onto a suitable target, not shown. The beam of electrons may be swept across the electron permeable window 19 by varying the magnetic field within the gap of the magnet 17. In addition, by selecting a certain magnetic field strength, the beam may be deflected approximately 45 degrees through an energy selecting slit and into a collector 21 wherein the beam current and beam energy may be measured, as desired. By reversing the direction of this certain magnetic field strength the beam may be diverted an equal amount on the other side of the center line of the scanner and through a second electron permeable gas tight window 22 for irradiating certain samples, as desired.

The remaining R.F. energy that was not converted into beam energy in the second accelerating section 16 is coupled outwardly thereof through a vacuum tight window 23 and waveguide 24 to a dummy load 25 wherein the energy is dissipated and prevented from reflecting back through the accelerating sections and waveguide plumbing to the high power source 9. Such undesired reflected energy sets up standing waves which may produce arcs within the guides or cracking of the vacuum tight wave permeable windows due to excessive heat being generated therein.

Evacuation of the accelerator apparatus is obtained by a plurality of pump-out tubes connected at intervals to the accelerator and thence to a vacuum manifold which is pumped via a high vacuum pump. The evacuating system is not shown. In addition, portions of the accelerator are cooled via coolant jackets and pipes affixed to the linear accelerator apparatus and carrying therewithin a circulating coolant. The entire cooling system is not shown.

The novel antisag circuit 4 of the present invention is shown in FIG. 3. More particularly, the pulse generator 1 supplies a square pulse to the primary of the pulse transformer 2 which serves to step up the voltage of the pulse from approximately 13 kv. to 150 kv. across the secondary thereof. The poor low frequency voltage response of the pulse transformer 2 will produce a substantial sag in the pulse appearing in the output or secondary of the transformer 2. A capacitive load consisting of series connected capacitors $C_1$ and $C_2$ is connected in series with a resistor 29 across the secondary winding of the pulse transformer 2 to improve the low frequency response and thereby to reduce the sag of the pulse.

A novel control electrode 28, the structure of which will be more fully described below, has been included within the electron gun assembly 5 for obtaining sharp beam pulses. The control electrode 28 may be connected in one of two ways. Connected one way the control electrode 28 operates as an accelerating anode. Connected another way the control electrode operates as a beam emission control electrode.

The aforementioned alternative accelerating anode circuit for the control electrode 28 is shown in FIG. 3. More specifically, the cathode 26 of the electron gun assembly 5 is connected to the negative terminal of the secondary of the pulse transformer 2 and the other terminal of the secondary of the transformer 2 is connected via ground to an anode 27 of the electron gun assembly 5. The novel control electrode 28 is energized via a tap 30 on the load resistor 29.

In operation when the operating pulse voltages are applied to the electrodes within the gun assembly 5 it is desired that the voltages of the control electrode 28 and the cathode 26 drop sharply and proportionately with respect to the anode voltage for maintaining a monoenergetic beam of electrons. Capacitors $C_1$ and $C_2$ form a low frequency voltage divider network. The value of capacitances $C_1$ and $C_2$ are properly proportioned to divide the low frequency Fourier components of the pulse such that a low percentage as of, for example, 12 percent of the voltage will appear between the cathode 26 and the control electrode 28, the remaining portion of the voltage appearing between control electrode 28 and anode 27.

The higher frequency Fourier components of the voltage pulse which are applied to the electrodes are determined by the proper positioning of the control electrode tap 30 on the load resistor 29. The tap 30 is positioned to divide the voltage arising from the high frequency Fourier components in the same percentage as was obtained for the low frequency Fourier components.

The beam emission control circuit alternative for the novel control electrode 28 is shown in FIG. 3a. More specifically, the control electrode 28 is connected to the cathode 26 via the intermediary of the secondary winding of a second pulse transformer 31. The output of the first pulse transformer 2, suitably compensated by the novel antisag network 3, is connected between the cathode 26 and anode 27.

In operation the control electrode 28 assumes the potential of the cathode 26 plus the voltage applied thereto via the secondary of the second pulse transformer 31. Thus unless a control signal is applied to the control electrode 28 via the transformer 31 the cathode 26 will be electrically shielded from the anode 27 and consequently no beam emission will result until the control electrode 28 is positively pulsed whereby precise control of the beam emission may be obtained.

The electron gun construction is shown in FIG. 2 wherein the cathode button 32 is heated by electron bombardment upon the backside thereof via the filamentry emitter 33 carried at its ends from the free end portions of two filament leads 34. One of the filament leads 34 extend axially of the cathode assembly and terminate in an apertured conductive block 35 which in turn is connected to a cup shaped metallic member 36 forming a portion of the vacuum envelope of the cathode assembly 5.

The filamentry emitter 33 is wound in a double spiral configuration and is supported in its middle via an insulated extension of a conducting filament support post 37 which extends axially of the cathode assembly 5 and terminates outside the vacuum envelope. Heating current is supplied to the filamentry emitter 33 by applying the filament potential between filament support post 37 and a terminal post 38. The terminal post 38 is connected electrically to one of the filament leads 34 via the cup shaped member 36 and conductive block 35. The other filament lead 34 is connected to and supported from the heavy conductive portion of the filament support post 37.

Electrons emitted from the filamentry emitter 33 are focused upon the backside of the cathode button 32 via a cylindrical heater focus electrode 39 which is mechanically supported from and electrically connected to the apertured conductive block 35. The cathode button 32 is supported from a hollow cylindrical cathode support 41 which extends coaxially of the cathode assembly 5 and is supported at one end via an annular flange 42 secured at its outside perimeter to an annular metallic conducting segment 43 of the cathode envelope.

Electrons emitted from the cathode button 32 are focused into a converging beam via hollow cylindrical focus electrode 44 which is supported from one end of a hollow cylindrical focus electrode support 45. The focus electrode support 45 is carried at its other end from an annular flange 46 secured at its outside peripheral edge to an annular conducting ring segment 47 forming a portion of the cathode vacuum envelope. A metallic strap 48 interconnects the two annular cathode envelope segments 43 and 47 such that the focus electrode 44 and the cathode button 32 will be operating at the same D.C. potential.

The outer cathode vacuum envelope of the cathode assembly 5 includes a plurality of alternate insulating and conducting ring members sealed together at their abutting ends in a vacuum tight manner. The insulating ring members serve to allow the conducting ring members to be utilized as terminals for applying various different desired D.C. potentials to the electrodes within the cathode assembly 5. The longest insulating annular ring member forms a high voltage insulator 49 for holding off the potential applied between the cathode button 32 and the control electrode 28. The electron gun assembly 5 is fixedly carried from the pre-buncher section 6 via an annular thick walled flange member 52.

The novel beam control electrode 28 (see FIGS. 2 and 2a) extends transversely of and within the pre-buncher section 6 and is fixedly secured near its periphery to the annular thick walled flange member 52, as by, for example, a plurality of cap screws. The control electrode 28 is of relatively thick walled construction for good thermal conductivity and centrally bored to receive the beam of electrons passable therethrough.

An annular recess 55 is provided in the control electrode 28 intersecting with a plurality of converging bores 56. The annular recess 55 and the plurality of converging bores 56 serve to facilitate pumping of the evacuated gun assembly 5 and pre-buncher 6 by allowing gases to freely flow through the transversely disposed control electrode 28. The bores 56 are convergingly disposed to prevent an electrical discharge from developing between elements within the cathode assembly and the anode 27.

If bores 56 were in axial alignment with the longitudinal axis of the gun assembly the control electrode 28 would appear permeable to high velocity axially traveling ions and electrons produced by ionization of residual gas molecules within the gun assembly and would attain high velocities under the influence of high potential fields created in use. The high velocity ions would travel through the control electrode 28 and impinge on the cathode assembly resulting in undesired pitting of the cathode elements from ion bombardment. The control electrode 28 appears substantially nonpermeable to ions and electrons having high axial velocities thereby preventing initiation of such undesired bombardment or discharge.

A hollow cylindrical heat shield 53 as of, for example, copper is positioned externally to and coaxially of the cathode button 32 and filamentray heater assembly 33 and extends longitudinally of the cathode assembly at its free end portion to a point midway of the high voltage annular insulating member 49. The cylindrical heat shield 53 is fixedly carried at one end thereof from the control electrode 28 and serves to heat shield the high voltage insulator 49 from heat which is generated by the filamentary heater 33 and by bombardment of the cathode button 32. Overheating of the high voltage insulator 49 will produce cracking thereof, thereby destroying the vacuum integrity of the cathode assembly 5.

The heat shield 53 further serves to prevent electron bombardment of the cathode envelope segments 54, which operate at control electrode potential, due to higth field emission between the hot cathode assembly and the conducting segments 54 of the cathode envelope. Thermal energy collected by the heat shield 53 is rapidly conducted therefrom to the relatively thick walled control electrode 28 and thence via thick walled flange member 52 to the oil bath in which the cathode asembly is immersed.

The pre-buncher assembly 6 includes a substantially hollow reentrant cylindrical vacuum tight envelope formed from a plurality of ring segments joined together at their ends in a vacuum tight manner. The reentrant portion is covered via a centrally apertured thick walled plate 57 as of, for example, copper. The pre-buncher envelope is fixedly mounted with respect to the oil tank 3 via a flange assembly 59 fixedly secured to the outer envelope of the prebuncher section 6 substantially midway of its length.

The centrally apertured anode 27 is fixedly secured transversely of and closing off the innermost end of the reentrant portion of the pre-buncher envelope. The reentrant portion of the pre-buncher envelope includes a hollow cylindrical magnetic shield 61 carried at one end from the pre-buncher end covering plate 57. A large annular electrical insulator 58 as of, for example, glass forms a portion of the outer envelope of the pre-buncher section 6 and the insulator 58 is designed to hold off at least 130 kv. which is the operating potential applied between control electrode 28 and anode 27.

The anode 27 is constructed from two annular discs fixedly secured together as by, for example, brazing. The innermost disc is made of copper to allow good thermal conductivity. The outer disc of the anode 27 is made of a magnetic material as of, for example, iron and together with the cylindrical magnetic shield 61 prevents external magnetic fields from disturbing the trajectory of the electron beam after it passes the anode 27. The beam in the region immediately after passing through the apertured anode 27 is particularly susceptible to magnetic steering effects because the electrons only have velocities corresponding to 150 kv. Later the electrons will attain energies in the order of several million electron volts and will be less susceptible to undesired magnetic steering effects.

A hollow cylindrical drift tube 62 as of, for example, stainless steel is fixedly secured to the backside of the anode 27 and extends axially of the prebuncher section 6. The drift tube 62 is made of a nonmagnetic material to allow controlled steering and focusing the beam, as desired. In addition, stainless steel supplies sufficient structural strength to support an electromagnetic beam focusing solenoid 63 slideably mounted upon the drift tube 62.

A hollow annular magnetic yoke 65 envelopes the beam focusing solenoid and is provided with an annular gap 66 circumscribing the inside perimeter thereof for defining therebetween a magnetic lens for focusing the electron beam. Two quadratured pairs of beam deflecting coils 64 for steering of the beam are embedded in epoxy resin and are carried within a recessed inside periphery of the magnetic yoke 65 of the beam focusing solenoid 63.

The beam optics within the prebuncher assembly 6 are adjusted such that the electron beam, as it comes through the centrally apertured control electrode 28, is focused for a crossover prior to reaching the gap between control electrode 28 and anode 27. The beam is therefore diverging as it enters the gap between the control electrode 28 and the anode 27. The mutually opposing protruding portions of the anode 27 and control electrode 28 form an electrostatic lens which has a focal point just beyond the apertured accelerating anode 27. The electrons within the beam are therefore diverging again as they come within the influence of the slideable magnetic focus solenoid 63. The magnetic solenoid 63 is positioned axially along the drift tube 62 such that the diverging tendency of the electron beam is exactly compensated for to produce a parallel or converging beam of electrons behind the magnetic focusing solenoid 63. The beam is centered within the drift tube 62 via proper energization of the beam deflecting coils 64.

The prebunching cavity 7 is disposed in the beam path after the magnetic focusing solenoid 63 for receiving the electron beam passable therethrough. The prebunching cavity 7 is excited via electromagnetic wave energy picked up from the output of the high power R.F. source 9 via the novel power pick up 12 and applied to the prebunching cavity 7 via coaxial line 13 (see FIG. 1). The prebunching cavity 7 serves to velocity modulate the electrons such that they will form into precise electron bunches by the time they arrive at the entrance to the first accelerating section 8. A movable diaphragm tuner 67 (see FIG. 2) provided within the prebunching cavity 7 for precise tuning thereof. The power and phase of the R.F. energy applied to the prebunching cavity 7 is variable, as desired, by varying the controls associated with the power pick up 12. The power pick up 12 will be more fully described below.

The beam leaves the prebuncher cavity and passes axially through a relatively long segmented drive tube 68. First and second beam confining solenoids 69 and 71 circumscribe the segmented drift tube 68 and serve to provide an axial magnetic field for confining the electron beam against space charge forces which cause radial expansion of the beam. The second beam confining solenoid 71 is larger to provide a stronger confining magnetic field as the electron bunches, when they reach this region, have greater density and therefore larger space charge induced radial expanding forces to be counteracted.

A cylindrical metallic longitudinally expanding bellows 72 forms a portion of the segmented drift tube 68 and is provided to allow for thermal expansion and contraction of the drift tube 68 and to facilitate disassembly of the accelerator apparatus by allowing the beam confining coil assemblies and drift tube 68 to be easily removed from the structure.

The novel power pickup 12 of the present invention is shown and described in FIGS. 4, 5, 5a and 5b. In particular two coupling loops 73 and 74 extend into the waveguide 11 through the apertured short side wall thereof. The coupling loops 73 and 74 are oriented at 90° with respect to each other and their orientation within the waveguide 11 may be synchronously varied over 360° by synchronously rotating the loops. This varies the phase of the power coupled out of the waveguide 11. In addition to the magnitude of the power coupled from the waveguide 11 may be adjusted by synchronously translating the two pickup loops 73 and 74 transversely of the waveguide 11.

Synchronous rotation of the coupling loops 73 and 74 within the waveguide 11 is obtained by energization of reversible motor 75 which produces rotation of shaft 76 via spring coupler 77 and gear 78 fixedly secured to shaft 76 substantially at one end thereof. Gear 78 meshes with gear 79 which in turn meshes with idler gear 81 which in turn drives gear 82.

Rotating coaxial joints 83 and 84 and coupling loops 73 and 74 are fixedly secured respectively to driven gears 79 and 82. Gears 79 and 82 are caused to rotate in the same direction and at the same angular velocity due to the provision of the idler gear 81 between gears 79 and 82. Thus by energization of reversible motor 75 the coupling loops 73 and 74 which are fixedly secured to gears 79 and 82 are caused to be synchronously rotated through equal angular rotation within the waveguide 11.

The pickup loops 73 and 74 are disposed an odd number of quarter wavelengths apart in the axial direction within the waveguide 11. The energy picked up by the loops is fed via coaxial lines contained within the coaxial rotating joints 83 and 84 and thence via coaxial T 85 and coaxial line 13 to the prebuncher cavity 7 to produce excitation thereof.

Any desired phase angle of the voltage picked up with respect to the energy passing through the waveguide 11 may be selected merely by synchronously rotating the pickup loops 73 and 74. The rational behind the independent phase control can be seen by reference to FIGS. 5a and 5b. Two vector voltage diagrams for the loops 73 and 74 are shown in FIG. 5b. The real components of the voltages picked up in the individual loops 73 and 74 are projected at right angles to account for the quarter wave spacing of the loops 73 and 74. The voltage components are added in the total voltage vector diagram. From the total voltage vector diagram it can be seen that the phase of the total voltage may be varied over 360° by synchronous rotation of the loops 73 and 74.

The magnitude of the voltage, picked up by the pickup 12, is determined by the amount to which the coupling loops 73 and 74 are inserted transversely of and within the waveguide 11. Translation of the loops 73 and 74 (see FIG. 4) within the waveguide 11 is obtained by energization of reversible motor 86 which produces rotation of gear 87 via the gear train including shaft 88, gear 89, gear 91 and shaft 92. Gear 87 is meshed with traveling worm gear 93 which in turn is meshed with an identical traveling worm gear 94. The worm gears 93 and 94 (see FIG. 5) are threadably mated at their inside perimeters with concentrically disposed hollow flanged worm shafts 95 and 96 respectively. The flanged worm shafts 95 and 96 are restrained against axial travel by being fixedly secured at the flanged portions thereof to the narrow side wall of the waveguide 11. Compression springs 99 and 101 bear against the two arms of the coaxial T assembly 85 forcing a bearing engagement of the coaxial loop assemblies against the traveling worm gears 93 and 94 via the intermediaries of spacers 97 and 98 respectively. Thus loops 73 and 74 are caused to move inwardly and outwardly of the waveguide 11 in accordance with the axial travel of the traveling worm gears 93 and 94 which are driven via gear 87.

The rational behind the symmetrical increase and decrease in voltage coupled outwardly of the guide 11 by changing the insertion of the loops within the guide can be seen by reference to FIG. 5b. More specifically, as the insertion of the loops is changed within the guide the individual lengths of the real components of the power picked up by the individual loops is increased or decreased in variable accordance with the insertion. Thus the projections of these changed real components also produces a changed total voltage component.

Remote loop orientation indication (see FIG. 4) within the waveguide 11 is obtained via changing the resistance of a potentiometer 103 geared to the loops and measuring the variable voltage drop across said potentiometer via a meter, not shown. The potentiometer 103 is operable over approximately 300° of its shafts rotation corresponding to approximately 400° of loop rotation and is coupled to the loop drive gear train via gears 104 and 105, gear 105 being fixedly secured to the loop drive shaft 76. Limit switches, not shown, are arranged to be actuated at the extremes of travel of the potentiometer 103 to de-energize the loop rotating drive motor 75 to prevent over travel of the potentiometer 103.

Remote loop insertion indication within the waveguide 11 is determined by the change in resistance of a potentiometer 106 geared to the loop translation drive gear train, said change in resistance being monitored by a meter disposed in a remote location, not shown. The potentiometer 106 is coupled to the loop translation drive motor 86 via the intermediary of a gear train including gear 107 fixedly secured to the potentiometer drive shaft which, in turn, is driven from the motor 86 via gears 91 and 89.

Loop insertion limit switches 108 and 109 are connected in the circuit for the loop translation drive motor 86 to prevent the motor 86 from over driving the loop assemblies transversely of the waveguide 11. The limit switches 108 and 109 are actuated via a rod 111 driven from the potentiometer drive shaft 110 via a cross bar 112 fixedly secured to the actuating rod 111 and threaded for mating with the threaded drive shaft 110 of the potentiometer 106. The limit switch actuating rod 111 is restrained against angular rotation by passing through an aperture in a supporting base plate member 113 which is fixedly secured by a plurality of bolts and spacers from a rectangular mounting plate 114 carried upon the waveguide 11.

A hollow rectangular gas tight loop drive housing 115 is fixedly secured to the mounting plate 114 in a gas tight manner to allow pressurization of the waveguide 11 and loop drive housing 115. The coaxial line 13 carrying the power picked up by the loops 73 and 74 passes outwardly of the loop drive housing 115 via a hermetically sealed coaxial connector 116 carried from the mounting plate 114. The loop drive motors 75 and 86 are fixedly secured upon the base plate 113 via a plurality of bolts 117 extending coaxially of spacers 118 and are anchored in the base plate 113.

A gas pressure of 26 pounds per square inch, gage, is maintained within the waveguide 11 and loop drive housing 115. A gas having a high dielectric strength as, for example, dichloro-difluoromethane (Freon 12) is used to prevent arcs from developing between points of high voltage and to allow cooling of the wave permeable windows 14, as previously described.

The first beam accelerating section 8 is shown in FIG. 6. More specifically, the R.F. driving energy derived from the high power source 9 is fed to the first accelerating section 8 via rectangular waveguide 11. The R.F. energy passes through rectangular waveguide 11 and thence through a short tapered transition waveguide section 125, thence through a short section of lower impedance rectangular guide 126 which intersects with a hollow cylindrical chamber 127 at a coupling iris 128.

The structure of the accelerating section 8 includes a disc loaded waveguide thereby forming a slow wave structure. More specifically, a hollow cylindrical conductor 129 carries therewithin and transversely thereof a plurality of centrally apertured conductive disc members 131 thereby forming a plurality of cavity resonators 132 capacitively coupled together through the central apertures 133.

The phase velocity of the slow wave structure is designed such that it is equal to the velocity of the electrons at any given point within the structure. This means that the phase velocity must increase from the beginning of the slow wave structure to the end thereof in variable accordance with the increase in velocity of the electrons. The phase velocity of the slow wave structure is a function of the disc spacing, i.e., the distance between the center lines of adjoining discs 131, of the inside diameter of the coupling holes 133, of the outside diameter of the discs 131 and of the thickness of the discs 131 and the shape of the disc at the perimeter of the hole 133. In previous linear accelerator sections of this type the disc coupling hole diameter, disc outside diameter, and disc spacing parameters were varied from cavity to cavity within the accelerator section to provide the necessary changes in phase velocity.

In the present accelerator section the disc thickness and coupling hole diameter has been held constant throughout the accelerator structure 8 and the disc spacing has been progressively increased and disc outside diameters have been progressively decreased down the accelerator section to maintain the increasing phase velocity. Thus the present accelerator section utilizing a constant coupling hole diameter and disc thickness presents an accelerator section which is considerably easier to build, as one of the variable parameters has been eliminated.

The R.F. driving energy is coupled into the accelerating section 8 via a centrally disposed coupling hole 134 communicating between the first resonant section 132 of the slow wave structure and the hollow cylindrical chamber 127. The other end closing wall 130 of the hollow cylindrical chamber 127 is centrally bored at 135 to allow the passage of the beam of electrons therethrough. However, the end wall 130 is made relatively thick such that the bore 135 forms a cylindrical waveguide section having a cutoff frequency substantially higher than the operating frequency of the slow wave propagating structure such that negligible R.F. energy is coupled outwardly of the cylindrical chamber 127 via the bore 135.

The unused driving R.F. energy after passing through the slow wave accelerating section 8 is coupled outwardly thereof via a centrally apertured disc 136 into a hollow cylindrical chamber 137. The energy is coupled out of the chamber 137 via coupling hole 138 and rectangular waveguide tapered transition section 139 through the rectangular waveguide 141 to the novel phase shifter and attenuator 15.

Three beam confining solenoids 142 circumscribe the hollow cylindrical slow wave structure. The solenoids 142 are carried upon a hollow cylindrical sleeve 143 which is carried coaxially of and slightly spaced apart from the hollow cylindrical conductor 129, thereby forming an annular chamber 144 therebetween. The annular chamber 144 is provided for circulating a coolant therethrough to remove excess heat caused by interception of portions of the electron beam upon the slow wave structure and to cool the windings of the solenoid 142. The electrical stability of the linear accelerator is greatly enhanced by cooling of the accelerating sections 8 and 6 as the temperature thereof is stabilized thereby preventing undesired changes in resonant frequency of cavities 132 resulting in undesired fluctuations in output performance and serious mismatches to the klystron 9. The cylindrical sleeve 143 is centrally apertured at 145 at approximately 60° intervals about its circumference to accommodate a plurality of jack screws 146.

The jack screws 146 are contained within a suitably radially bored ring and the ring is fixedly secured in a water tight manner to the sleeve 143. The jack screws 146 are provided with enlarged pads at one end thereof and are angularly adjustable to coaxially position the disc loaded hollow conductor 129 within the sleeve 143, as desired, to minimize beam interception. Pipe plugs 147 are threaded into the open end of the radially bored portions of the ring to prevent the escape of coolant therefrom.

Cylindrical sleeve 143 is provided with a pair of relatively thick walled flanges 148 at both ends thereof. The flanges 148 are centrally recessed about the inside periphery thereof to form coolant distribution manifolds 149. The coolant manifolds 149 communicate with coolant conducting conduit 151 which serve to convey coolant to and from the accelerating section 8 to prevent overheating thereof.

The novel phase shifter and attenuator 15 is shown in FIGS. 7 and 7a of the drawings. The unused R.F. power in the output of the first accelerating section 8 is fed via waveguide 141, wave permeable window 161 and inductive matching iris 162 to a waveguide T 163. At the waveguide T 163 the power is equally divided and one half thereof is propagated to the left in a main waveguide 164 and the other half of the power is propagated to the right down the main waveguide 164. The power that is traveling to the left within waveguide 164 proceeds to a first short slot hybrid coupler 165 at which, with the cooperation of two movable waveguide shorts 167, the power is caused to perform a 180° change in direction and proceed down an auxiliary waveguide 166 in the direction of the arrows.

The two movable noncontacting waveguide shorts 167 are provided for closing off the open ends of main and auxiliary waveguides 164 and 166. By changing the longitudinal position of the movable noncontacting shorts 167 the phase of the power that is reversed at the first hybrid coupler 165 may be varied, as desired. The power that proceeds down auxiliary waveguide 166 comes to a second short slot hybrid coupler 168 where it is combined with the power traveling to the right down main waveguide 164.

At the second hybrid coupler 168 any desired percentage of the total power entering the second hybrid coupler 168 may be directed into a dissipative load 169 via main waveguide 164 by varying the phase of the power entering from auxiliary waveguide 166. The power that is not diverted to the dissipative load 169 is diverted or continues past the second hybrid coupler 168, down the auxiliary waveguide 166 in the direction of the arrows. This power continues down auxiliary waveguide 166 to a third hybrid coupler 171 which functions identically as the first hybrid coupler 165 and reverses the direction of the power and diverts it into a third waveguide 172 in the direction of the arrows. Noncontacting movable waveguide shorts 173 are provided closing off waveguides 166 and 172 and serve when longitudinally actuated to vary the phase of the power diverted by the third hybrid coupler 171 into waveguide 172. The power diverted into waveguide 172 is propagated therethrough to a wave permeable vacuum tight window 174 thence into the second accelerating section 16 via waveguide transition means and coupling means as shown with regard to accelerating section 8.

Reflected power that arises within the novel phase shifter and attenuator 15 as, for example, due to misalignments of the two pairs of noncontacting tuning plungers 167 and 173 and which otherwise would produce undesirable standing waves within the apparatus is propagated through the structure in a direction opposite to the desired direction and thus will converge at the waveguide T 163. Reflected energy converging on the waveguide T 163 is diverted into waveguide 175 and through inductive matching iris 176 and thence via an elbow 177 to a dummy nonreflecting load 178. Within the load 178 the power is attenuated and thereby prevented from being reflected down waveguide 141 and back through the accelerating section 8 where it might produce excessive voltages and voltage breakdowns resulting in disablement of the equipment.

In operation the magnitude of the power that is fed into the second accelerating section 16 via waveguide 172 may be variable controlled as desired, by synchronously longitudinally moving the first pair of waveguide shorting plungers 167. The phase of the wave energy fed into the second accelerating section 16 via the waveguide 172 is variably controllable by synchronously moving the second pair of noncontacting waveguide shorting plungers 173.

The two identical pairs of waveguide shorting plungers 167 and 173 and their longitudinally actuating mechanisms are shown in detail in FIGS. 7 and 7a. More specifically, a rectangular shorting block 181 is provided with two axial undercuts at the top and bottom thereof to provide a choke section for presenting a short circuit to the R.F. energy at the face of the shorting block 181. The noncontacting shorting block 181 is carried from the front side of a rectangular guide block 182. The guide block 182 abuts at its backside against a rectangular spring finger carrier block 183.

A plurality of conducting spring fingers 184 are fixedly secured at one end thereof to the spring finger carrier block 183. The spring fingers 184 are tensioned outwardly of the carrier block 183 and bear at a knee portion thereof against the inner side walls of the rectangular waveguide. The free end portion of the spring fingers 184 bear in slideable engagement against a flanged portion of the guide block 182.

The function of the spring fingers 184 is to provide electrical contact between the guide block 182 and the waveguide for proper operation of the half wave choke built into the tuning plunger 181. In addition, the spring fingers properly transversely align the noncontacting shorting block 181 within the rectangular wave guide. The spring finger carrier block 183, guide block 182 and the rectangular waveguide shorting block 181 are rigidly held together via a plurality of screws, not shown.

A hollow cylindrical shaft 185 is fixedly secured as by, for example, brazing to the backside of the rectangular spring finger carrier block 183. The other end of the hollow cylindrical shaft 185 is fixedly secured to a centrally apertured and internally threaded rectangular guide block 186 carrying a plurality of spring fingers about its periphery for riding upon the interior surfaces of the rectangular waveguide. A worm shaft 187 extends through the central aperture in the guide block 186 and threadably mates with the internal threads thereof for driving the noncontacting waveguide shorting block 181 longitudinally of the rectangular waveguide in variable accordance with the rotation of the drive shaft 187. The noncontacting waveguide shorting block 181, rectangular guide block 182 and the spring finger carrier block 183 are centrally apertured longitudinally thereof to receive therewithin the free end portion of the drive worm shaft 187 when the shorting plunger assembly is driven to its fully retracted position.

The internal driving worm shaft 187 is rotated via an external drive shaft 188, coupled to the internal drive shaft 187 via the intermediary of a vacuum tight rotary bellows seal 189 and a universal joint 192. The rotary bellows seal is carried in a vacuum tight manner within an apertured waveguide end closing wall 191. The universal joint 192 allows for slight misalignments between the internal drive worm shaft 187 and the positioning of the vacuum tight rotary bellows seal 189.

External drive shaft 188 (see FIG. 7) is driven by a reversible motor 193 through the intermediaries of an electric clutch 194, angular gear box 195, and a second universal joint 196. The second waveguide shorting plunger, making up the pair of shorting plungers, has its angular gear box 195 driven from an output shaft 197 of the first angular gear box 195.

A readout potentiometer 201, for remote indication of the position of the pair of shorting plungers 173 is connected to the second angular gear box 195 via a universal joint 198 and gear reduction box 199, said reduction box having a gear reduction of 100 to 1. The readout potentiometer 201 is connected in circuit with a meter not shown, and may be calibrated in units of attenuation or phase angle, for the shorting plungers 167 and 173 respectively.

Two limit switches 202 are positioned to be actuated via rods extending transversely of the potentiometer drive shaft. The limit switches 202 are connected in the electrical circuit for the reversible motor 193 to prevent over travel of the waveguide shorting plungers 167 and 173 within the respective waveguide sections. The waveguide shorting plunger drive assemblies including the reversible motors 193 angular gear boxes 195 and the like are supported from the waveguide end closing wall 191 via brackets 203.

A gas pressure of approximately 26 pounds per square inch gage is maintained within the waveguide network forming the novel phase shifter and attenuator 15. The gas should have a high dielectric strength as, for example, difluoro-dichloro methane (Freon 12). Pressurizing the phase shifter and attenuator 15 serves to prevent arcs from developing within the waveguide shorts and hybrid couplers. The phase shifter and attenuator 15 need not be pressurized but may be evacuated thereby eliminating the necessity for waveguide windows 161 and 174.

The beam enters the second accelerating section 16 with energies substantially at or near 3 to 6 mev. Within the second accelerating section 16 depending upon both the phase and the magnitude of the wave energy applied thereto the electrons forming the beam may be accelerated to energies of 12 mev. or decelerated to 2 mev., while maintaining tight electron bunches, for minimizing its energy spread of the electrons within the bunches. It is desirable to have complete and independent control of the applied R.F. both as to phase and magnitude in order to have a continuous selection of output beam energies while maintaining a beam with small energy spread. If independent control is obtained only of the phase or only of the magnitude of the R.F. energy supplied to the second accelerating section 16 the output beam energies may be varied over a substantial range. However, it will be found that the output beam energy spread is larger and the output beam energy can never be less than the beam energy emerging from the first accelerator section if only amplitude adjustment is possible.

The second accelerating section 16 differs from the first accelerating section in that the spacing between adjoining discs, the outside diameter of the discs, the inside coupling hole diameter and the disc thickness are all constant throughout the accelerating section. This uniformity is allowed because the velocity of the electrons as they enter the second accelerating section 16 for all practical purposes have attained substantially the speed of light. As the electrons pass through the second accelerating section their energies may be increased or decreased as desired over a range of from 2 to 12 mev., but the change in energy of the electrons is produced largely by a change in mass of the electron rather than by a change in its velocity. For example, at 2 mev. the electrons have 97.91% of the velocity of light while at 12 mev. the electrons have a velocity of 99.92% of the velocity of light.

The novel beam scanning head 18 is shown in FIGS. 8-9d. In particular, the beam of high energy electrons, leaving the second accelerator section, passes into the narrow neck portion of the relatively flat flared scanning head 18. The beam deflecting magnet assembly 17 has the pole pieces thereof disposed straddling the narrow neck portion of the flared scanner head 18 for deflection of the beam in variable accordance with the magnitude of the magnetic field applied transversely thereof.

The side walls of the scanner head, in the vicinity of the narrow neck portion, are made relatively thick and are uniformly tapered to converge inwardly thereof at the edges (see FIG. 8a). The inwardly converging side walls are provided to avoid rapidly burning a hole in the side wall of the scanning head 18 if the beam were inadvertently directed into the head as by, for example, the application of a strong magnetic field when the beam energies were within a very low range. By inwardly converging the side walls of the scanner head 18 the beam will strike the side wall of the scanner head at a glancing incidence thereby spreading the beam energy over a larger area and decreasing the likelihood of burning a hole therethrough. In addition, the thick wall construction serves as a heat sink capable of absorbing a substantial amount of energy before melting.

The beam collector 21, which will be more fully described below, is disposed substantially at 45° of the center line of the beam scanner head 18. The beam collector 21 is connected to the scanner head 18 via a hollow rectangular tube 211 (see FIGS. 9, 9a and 9d). At the intersection of the rectangular tube 211 and the supporting scanner head 18 the scanner head is closed off by inwardly converging top and bottom side walls. The inwardly converging top and bottom side walls minimize the likelihood of burning a hole through the end closing wall if the electron beam were inadvertently directed thereagainst. A thin longitudinal slot 212 in alignment with the collector 21 is provided in the converging portion of the scanning head 18. The slot allows the electron beam to pass therethrough thence via the hollow rectangular tube 211 into the beam collector 21.

The structure of the beam collector 21 includes (FIG. 9d) a hollow cylindrical collecting block 213 having an inwardly converging and terminated cavity 214 therewithin for collecting and dissipating the energies of the electrons within the beam. Two sets of helical grooves 216 are provided on the outside surface of the initial portion of the collector block 213 and serve to carry coolant fluid in a spiral fashion around the initial portion of the beam collector block 213 in one direction and to return it in a helical fashion in the opposite direction. The collector coolant is carried to the collector 213 via coolant tubes 217. The beam collector 213 is carried concentrically of and within a hollow cylindrical collector housing 218.

The collector block 213 is vacuum sealed to the collector housing 218 via the intermediary of an annular dielectric insulator 221 sealed at its end, in ceramic to metal seals, to two annular frames 222 and 223. The two metal annular frame members 222 and 223 respectively are sealed at their other ends as by, for example, brazing to the collector housing 218 and to the collector block 213 via an annular flange member 219. The annular insulator 221 allows the beam collector block 213 to operate at a different D.C. potential than the collector housing 218 and facilitates the measurement of beam current collected by the collector 213. The beam current is measured by measuring the current flow between the collector 213 and the grounded collector housing 218 via the intermediary of a coaxial line 224. The collector housing 218 is carried from the scanner head 18 via the rectangular tube 211 and a mounting flange assembly 225.

The beam energy may be ascertained by measuring the temperature rise of the coolant circulated through the collector block 213 and the beam current and correlating these two measurements. By knowing the beam energy and the angular deflection of the beam necessary to pass through the beam collimating slot 212 and into the collector 21, the magnet current necessary to produce the beam deflecting field may be calibrated in units of beam energy.

A dielectric foam 226 fills in the open hollow spaces at the open end of the cylindrical collector housing 218 between and around the beam collector block 213. The foam 226 prevents undesired convection cooling of the collector 213 and collection thereon of ions from the air which would distort the beam current measurements.

The beam output port 22 is disposed substantially 45° from the center line of the housing 18 and is shown in cross sectional view in FIGS. 9b and 9c. A gas tight electron permeable window member 227 as of, for example, thin aluminum foil is carried within and transversely of a hollow cylindrical flange assembly 228. The flange assembly 228 is carried upon the end of a hollow rectangular tube 229 which is fixedly secured at its other end to the outside surface of the inwardly converging and terminating scanner housing 18. The inwardly converging scanner housing 18 is longitudinally slotted in alignment with the output port 22 at 231 to allow the beam to pass through the scanner housing 18 and outwardly thereof through the tube 229 and electron permeable window 227.

The central portion of the scanner housing 18 is outwardly flared longitudinally thereof and closed off at its end portion via a transversely disposed electron permeable window 19 as of, for example, aluminum foil carried at its peripheral edges in a vacuum tight manner from a rectangular flange assembly 233. The electron beam may be swept across the window 19 for scanning large packages or materials, as desired, by cyclically varying the strength of the magnetic field produced at the gap of the beam deflecting electromagnet 17.

The scanner head 18 is reinforced (see FIG. 8) at its top and bottom side walls thereof via tapered beams 234 extending across the thin relatively flat scanner housing 18 from the relatively thick side closing walls thereof.

Fluid carrying coolant tubes 235 are fixedly secured to the beam scanning housing 18 via heat conductive material such that the beam scanning housing 18 may be cooled to prevent overheating thereof.

The novel beam deflecting pole piece configuration is shown in FIG. 10. More specifically, the pole pieces of the beam deflecting electromagnet 17 include a rectangular laminated core 241 as of, for example, iron surrounded by and carried within a hollow cylindrical pole cap 242. The cylindrical pole cap 242 includes a dielectric material as of, for example, epoxy resin containing embedded therewithin a finely ground magnetic permeable material as of, for example, powdered iron. The cylindrical pole cap 242 facilitates construction of the magnet pole as it is difficult to form a laminated pole piece of cross section other than rectangular shape. The pole cap 242 need not be of circular cross section but is readily formable to other desired shapes.

The percentage, by weight, of iron in a preferred embodiment being approximately 65%. In this manner the pole cap 242 is made magnetically permeable and yet the individual magnetic particles are separated by electrically insulating material whereby a tendency to produce undesired eddy currents therein is substantially minimized. In this manner efficient utilization of the alternating current applied to the sweep coils 243 circumscribing the pole cap 242 is obtained by minimizing the loss of magnetic field due to eddy current shielding and the like. The pole caps 242 are suitably bored at one end thereof to receive hold down cap screws 244 and inserts 245 which tightly hold the pole cap 242 and pole core 241 against the magnet yoke 246.

The wide side walls of the scanner housing 18 that are disposed adjacent the pole caps 242 of the beam deflecting electromagnet 17 are provided with inserts 247 made of a material having low electrical and good thermal conductivity as, for example, silicon bronze alloy in order to minimize eddy current shielding of the time varying beam deflecting magnetic field it is desired to pass therethrough.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A linear particle accelerator apparatus including a particle gun for forming a beam of particles, an accelerating section adapted to be excited by R.F. wave energy for accelerating the particles to high velocities substantially at the speed of light, a pulse transformer for obtaining high voltage pulses for applying to certain electrodes within said particle gun, a pulse generator for driving the primary of said pulse transformer, and a capacitive load coupled into the secondary of said pulse transformer for eliminating the tendency of the high voltage pulses to sag whereby substantially monoenergetic particles are obtained in the beam output of said particle gun.

2. The apparatus according to claim 1, wherein said capacitive load includes a plurality of capacitors series connected across the secondary of said pulse transformer, and a resistor series connected with said capacitors.

3. The apparatus according to claim 1 wherein said particle gun includes a cathode electrode, an anode electrode, and an accelerating control electrode disposed inbetween said cathode electrode and said anode electrode, and a second pulse transformer for applying pulse operating potentials to said control electrode with respect to said cathode electrode, and said capacitive load of said secondary of said pulse transformer being connected across said anode and cathode electrodes.

4. The apparatus according to claim 2 wherein said resistor is series connected inbetween two of said capacitors, and wherein said particle gun includes, an anode, a control electrode, and a cathode electrode, said control electrode being disposed inbetween said cathode electrode and said anode electrode, and said control electrode being connected into said resistor intermediate its length for voltage dividing the high frequency Fourier components of the output pulse of said pulse transformer as applied to said control electrode.

5. A linear particle accelerator apparatus including, means for forming and projecting a beam of particles into a substantially linear path, means for accelerating the particles to substantially the velocity of light, an elongated vacuum envelope containing therewithin said beam forming means and said beam accelerating means, a particle permeable window disposed substantially at one end of said vacuum envelope and forming a portion thereof for passing therethrough the particle beam, means forming a beam scanner for deflecting the particle beam transversely of the longitudinal axis of said envelope as desired, said scanner means including a flared portion of said vacuum envelope, said flared portion of said vacuum envelope having a pair of mutually spaced apart broad side walls and a pair of mutually spaced apart outwardly flared narrow side walls, and said narrow side walls defined by inwardly converging margins of said broad side walls to minimize damage to said scanner means by inadvertent particle bombardment.

6. A linear particle accelerator apparatus including, means for forming and projecting a beam of particles into a substantially linear path, means for accelerating the particles to substantially the velocity of light, an elongated vacuum envelope containing therewithin said beam forming means and said beam accelerating means, said elongated vacuum envelope having a flared portion substantially at one end thereof, a particle permeable window disposed substantially at the flared end of said vacuum envelope and forming a portion thereof for passing therethrough the particle beam, means for deflecting the particle beam transversely of the longitudinal axis of said elongated envelope as desired, a plurality of beam energy selecting ports disposed substantially an equal angular displacement from and on opposite sides of the longitudinal axis of said elongated envelope for passing therethrough the particle beam.

7. The apparatus according to claim 6 including means for collecting and measuring the beam energy disposed outwardly of one of said energy selecting ports whereby the beam energy may be monitored, as desired.

8. A linear particle accelerator apparatus including, means for forming and projecting a beam of particles into a substantially linear path, means for accelerating the particles to substantially the velocity of light, an elongated vacuum envelope containing therewithin said beam forming means and said beam accelerating means, said elongated vacuum envelope having a flared portion substantially at one end thereof, means for repetitively and cyclically deflecting the particle beam transversely of the longitudinal axis of said elongated vacuum envelope within the flared portion thereof, the side walls of said vacuum envelope disposed in close proximity to said beam deflecting means being made of a metal having low electrical conductivity and high thermal conductivity whereby the deleterious effects of eddy current shielding of the beam may be minimized in use thereby enhancing the beam deflecting efficiency.

9. An apparatus according to claim 8 wherein said metallic side wall portion of said vacuum envelope which is made of a material having low electrical conductivity and high thermal conductivity is made of a silicon bronze alloy.

10. A linear particle accelerator apparatus including, means for forming and projecting a beam of particles into a substantially linear path, means for accelerating the particles to substantially the velocity of light, an elongated vacuum envelope containing therewithin said beam forming means and said beam accelerating means, means for repetitively and cyclically deflecting the particle beam transversely of the longitudinal axis of said vacuum envelope, said beam deflecting means including an electromagnet having the particle beam passing through the gap thereof, and the pole pieces of said magnet composed of a finely ground magnetically permeable material embedded in a dielectric resin whereby the deleterious effects of eddy current power loss and magnetic shielding are minimized thereby enhancing the beam deflection efficiencies.

11. A linear particle accelerator apparatus including, means for forming and directing a beam of particles into a substantially linear path; means disposed along the beam path for accelerating the particles to substantially the velocity of light; said beam forming means including a particle emitter for supplying beam particles, a primary beam accelerating electrode for accelerating the particles emitted from the particle emitter, a non-intercepting beam control electrode disposed between said particle emitter and primary beam accelerating electrode and circumscribing the beam path, said beam control electrode adapted to electrically shield said particle emitter from the potential field created by said primary beam accelearting electrode when said beam control electrode is operated at substantially the same potential as said particle emitter whereby precise control of beam pulse widths may be obtained as desired, and said beam control electrode being perforated with a plurality of bores, the axis of the bores being at a substantial angle to the beam path whereby undesired particle bombardment of certain portions of said beam forming means is prevented in use.

12. Linear particle accelerator apparatus including; means for forming and projecting a beam of particles into a substantially linear path; means for accelerating the particles to substantially the velocity of light; said particle accelerating means including, a substantially hollow slow wave structure enveloping the beam of electrons passable therethrough, means for producing a beam confining magnetic field axially of said slow wave structure, and a hollow annular chamber disposed inbetween and coaxially of said beam confining field producing means and said slow wave structure thereby forming a cooling chamber annulus circumscribing said accelerating slow wave structure for circulating therethrough a coolant, a plurality of support structures positioned intermediate the length of said slow wave structure and extending radially inwardly across said annulus of said annular cooling jacket for changing the relative position of said slow wave structure to maintain said slow wave structure in axial alignment with the beam of electrons passable therethrough.

13. A linear particle accelerator apparatus including; means for forming and projecting a beam of particles into a substantially linear path; first means for accelerating the particles to substantially the velocity of light; second means for accelerating the particles forming the beam and for increasing the beam energy; means for supplying driving R.F. wave energy to said first and second beam accelerating means for accelerating the particles; and means for independently variably controlling the phase and magnitude of the R.F. wave energy applied to the second R.F. beam accelerating means as compared to that applied to said first beam accelerating means for varying the beam energy of the output beam over a wide range; said R.F. phase and magnitude controlling means including, a series connection of hollow waveguide networks, one of said waveguide networks being a variable attenuator and a second of said waveguide networks being a 4 port variable phase shifter, said 4 port variable phase shifting network including an input port, an output port, and a pair of variably shorted ports, said pair of shorted ports being shorted by movable devices movable within the waveguide network, and said movable devices moving in concert for variably controlling the phase of the wave energy at the output port with respect to that at the input port.

14. The apparatus according to claim 13 wherein said variable attenuator includes, a 5 port waveguide network having an input port, an output port, a load port terminated in an R.F. load, and a pair of shorted ports, said shorted ports being variably shorted via the intermediary of movable devices, said movable devices moving in concert for variably controlling the magnitude of the wave energy leaving said attenuator apparatus via said output port as compared to the magnitude of R.F. wave energy applied to said attenuator apparatus via said input port.

15. The apparatus according to claim 13 wherein said variable attenuator includes a 5 port waveguide network, said 5 port waveguide network including a pair of juxtapositioned waveguides coupled together at spaced apart locations via the intermediary of a pair of short slot hybrid couplers and including an input port, an output port, a port terminated in an R.F. load, and a pair of shorted ports, said pair of shorted ports being shorted by movable shorting plungers operating in concert whereby the magnitude of the R.F. energy appearing at the output port is variably controllable as compared to the magnitude of the wave energy applied to said variable attenuator via said input port.

References Cited in the file of this patent

UNITED STATES PATENTS

| | | |
|---|---|---|
| 2,392,380 | Varian | Jan. 8, 1946 |
| 2,537,862 | Samuel | Jan. 9, 1951 |
| 2,770,755 | Good | Nov. 13, 1956 |
| 2,813,996 | Chodorow | Nov. 19, 1957 |
| 2,829,299 | Beek | Apr. 1, 1958 |
| 2,842,705 | Chodorow | July 8, 1958 |
| 2,843,789 | Klein | July 15, 1958 |
| 2,846,613 | Pierce | Aug. 5, 1958 |
| 2,851,631 | Birdsall | Sept. 9, 1958 |
| 2,892,958 | Nygard | June 30, 1959 |
| 2,899,598 | Ginzton | Aug. 11, 1959 |
| 2,920,228 | Ginzton | Jan. 5, 1960 |
| 2,922,921 | Nygard | Jan. 26, 1960 |
| 2,925,522 | Kelliher | Feb. 16, 1960 |
| 2,933,611 | Foster | Apr. 19, 1960 |
| 2,993,141 | Post | July 18, 1961 |
| 2,993,143 | Kelliher et al. | July 18, 1961 |

FOREIGN PATENTS

| | | |
|---|---|---|
| 1,141,687 | France | Sept. 5, 1957 |